Sept. 12, 1967 W. D. PAINTER 3,341,117
COORDINATE SYSTEM CONVERTER
Filed Jan. 19, 1966 2 Sheets-Sheet 1
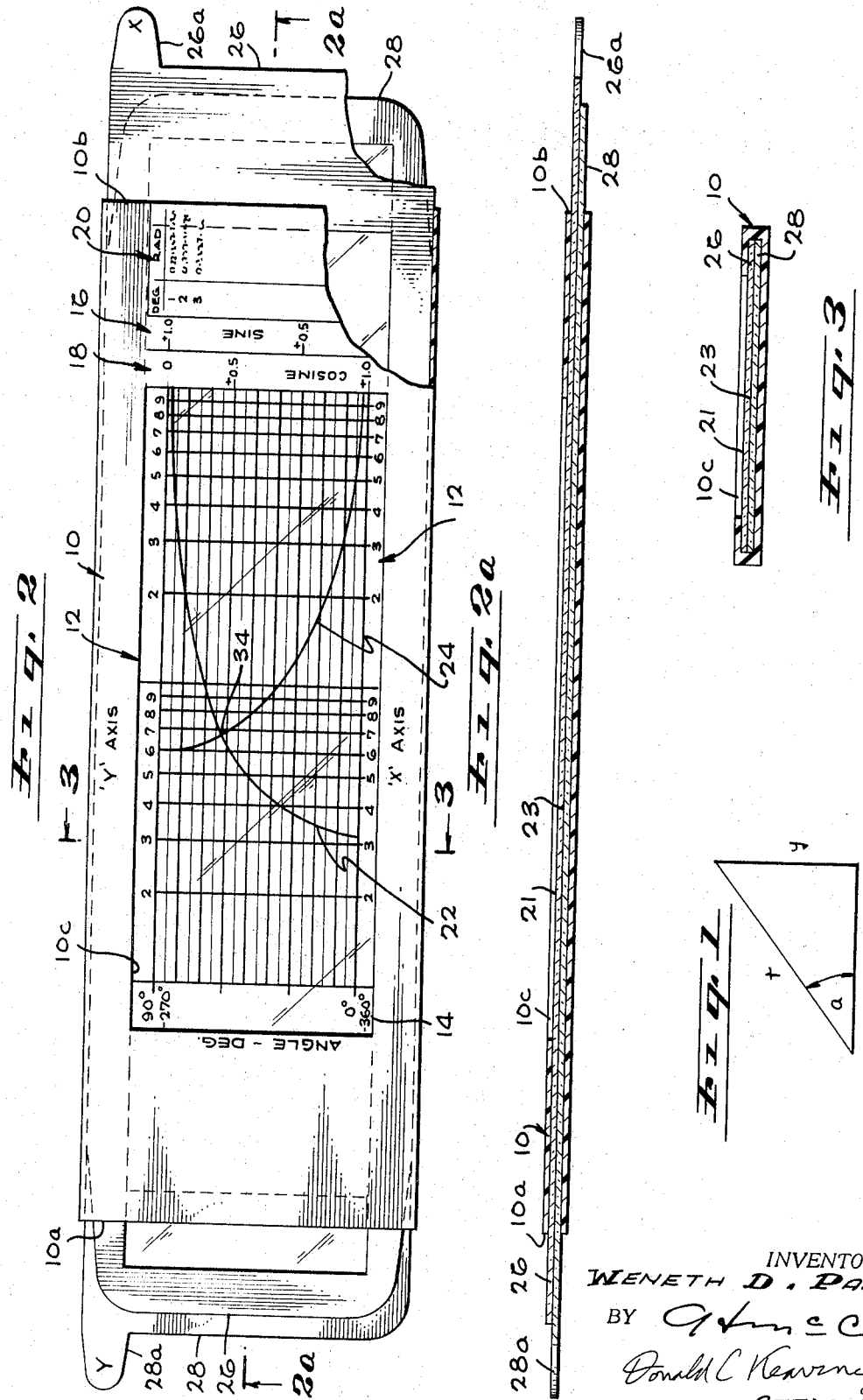
INVENTOR.
WENETH D. PAINTER
BY
ATTORNEYS

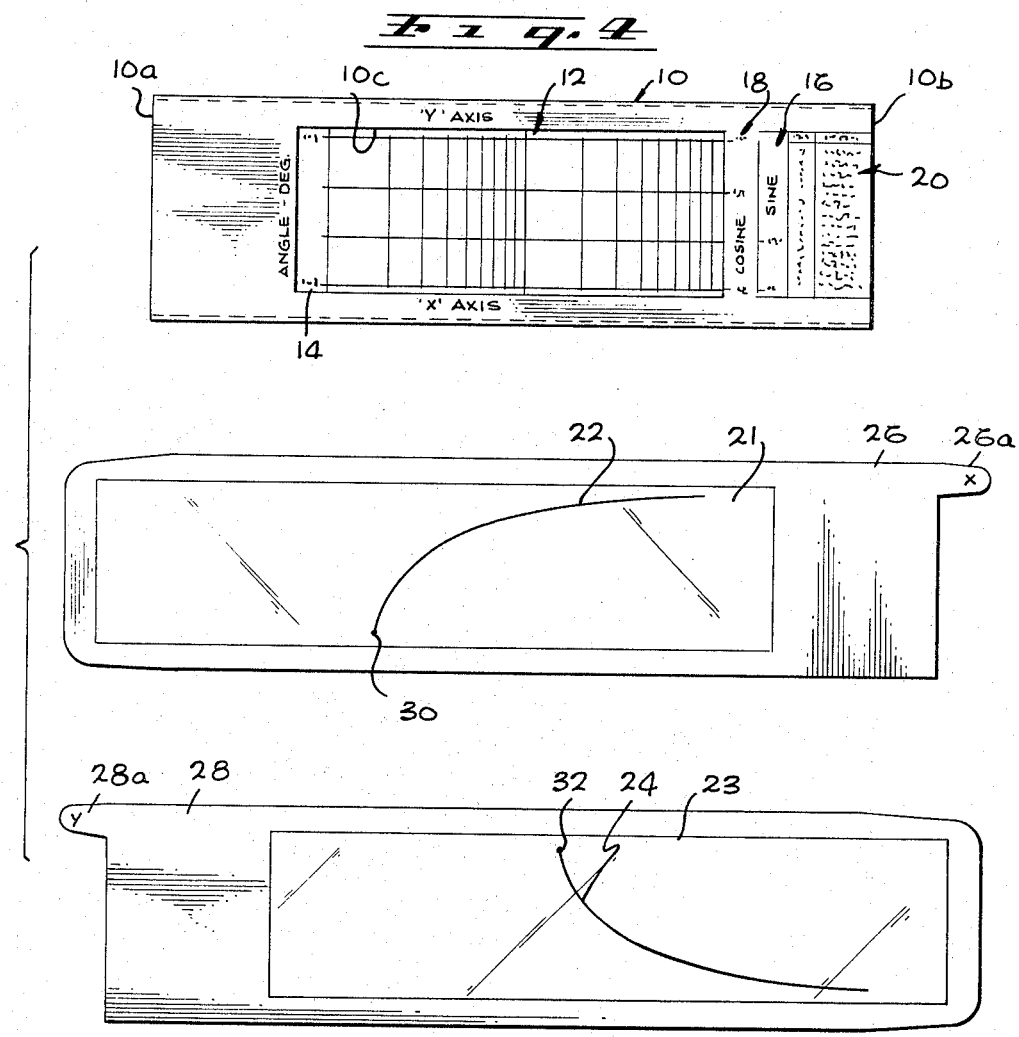

United States Patent Office 3,341,117
Patented Sept. 12, 1967

3,341,117
COORDINATE SYSTEM CONVERTER
Weneth D. Painter, 43653 Foxton Ave.,
Lancaster, Calif. 93534
Filed Jan. 19, 1966, Ser. No. 521,756
9 Claims. (Cl. 235—89)

ABSTRACT OF THE DISCLOSURE

A slide-rule type device in which an envelope guide structure is utilized to slidably guide first and second sliders carrying first and second trigonometric function curves, respectively. A window-forming aperture is defined on the top side of the envelope structure, so that the two curves are visible therethrough. Also, first and second scales on the bottom side of the structure are visible through the window, so that as the sliders are guided within the structure, the point of intersection of the two curves with respect to the first and second scales is visible through the window.

The invention described herein was made by an employee of the United States Government and may be manufactured and used by or for the Government for governmental purposes without the payment of any royalties thereon or therefor.

This invention relates to devices for use in changing data from one system of coordinates to another and, more particularly, to such a device which is of slide-rule type and is adapted to change a coordinate from a rectangular system to a polar system and vice versa.

Heretofore, conversion of coordinates from say the polar system to the rectangular system has involved either manual calculations or the use of a computer. Manual calculations are laborious and time consuming and the use of a computer, while admittedly fast in its action, is overly costly for the relatively simple calculations required.

The present invention provides an economical and extremely fast way of making such conversion calculations. The invention is embodied in a slide-rule type of device, which comprises a logarithmic scale over which are mounted two transparent overlays, movable with respect to each other and with respect to the logarithmic scale. The two overlays have curves representing trigonometric functions plotted thereon, and, by properly positioning the overlays with respect to each other and to the scale, conversion can be made from the polar coordinate system to the rectangular coordinate system or vice versa. The conversion is made quickly and accurately without the use of expensive equipment.

Further features and advantages of the invention will become apparent from the following description, taken in conjunction with the accompanying drawings, in which:

FIGURE 1 is a diagram useful in understanding the invention;

FIGURE 2 is a plan view of an assembled device embodying the invention;

FIGURE 2A is a cross sectional view taken across line 2a—2a in FIGURE 2;

FIGURE 3 is a sectional view taken of the line 3—3 of FIGURE 2;

FIGURE 4 is a plan view of an envelope containing the logarithmic graph and the two overlays utilized therewith, shown in separated form; and FIGURE 5 shows supplemental information that may be mounted in sheet form on one end of the device of the invention for the convenience of a user.

Because the present invention is based upon geometric principles, it can be best understood by first referring to the right triangle shown in FIGURE 1. As shown, the triangle has sides $r$, $x$, and $y$, with the sides $r$ and $x$ defining an angle $a$. According to well-known trigonometric principles, csc $a=r/y$ and sec $a=r/x$. Thus, $r=y$ csc $a$ and $r=x$ sec $a$. It follows then that $r=y$ csc $a=x$ sec $a$. Therefore, if a cosecant curve and a secant curve are plotted, which functions vary inversely with each other, they can be superimposed on a suitable scale and their intersection point will give the values of $r$ and the angle $a$. Of course, the two curves must be movable relative to each other and to the scale over which they are mounted in order to solve for various values of $r$ and $a$. Similarly, if the values of $r$ and $a$ are known, the two curves can be adjusted so that their point of intersection corresponds to the values of $r$ and $a$ and the rectangular coefficients $x$ and $y$ read from the scale where the two curves intersect it. In the present case, the scale is logarithmic and so the cosecant and secant curves are plotted on the same basis. This substantially decreases the length of the scale, and permits the device of the invention to be made approximately the size of a conventional slide rule. The logarithmic feature, however, is not to be considered a limitation on the invention.

FIGURES 2, 3 and 4 illustrate a typical conversion device embodying the invention. A guide structure such as an envelope 10 having open ends 10a and 10b is provided with a graph comprising a horizontal two-cycle logarithmic scale 12 on the inside of its bottom surface and with an aperture or window 10c in its top surface to make the scale 12 visible. The logarithmic scale 12 extends from left to right as shown in the figures and is scaled in units of length. The envelope 10 is also provided with a vertical linear scale 14 adjacent the scale 12 at one end thereof and visible through the window 10c. The linear scale 14 is scaled over 90°, for example, from 0° to 90° of from −360° to −270°. Thus, the two scales are normal to each other. Sine and cosine scales 16 and 18, respectively, may be attached to or printed on the top surface of the envelope 10 at the end opposite the scale 14 outside the window 10c. Also, a conversion table 20 for converting from degrees to radians may be printed on or secured to the top surface of the envelope 10 adjacent the scale 16.

A transparent overlay 21 is provided having a secant function curve 22 thereon plotted to the logarithmic scale of the scale 12. A second transparent overlay 23 is also provided having a cosecant function curve 24 similarly plotted thereon to the same scale.

The transparent overlays 21 and 23 are contained within sliders 26 and 28, respectively, which fit within the envelope 10 and are slidable with respect to each other and with respect to the envelope 10. The slider 26 is provided with a tab 26a at one end thereof and the slider 28 is similarly provided with a tab 28a at its end opposite to that of the tab 26a on the slider 26. The tabs 26a and 28a provide a convenience for a user in adjusting the sliders 26 and 28 relative to each other and to the scale 12 in the envelope 10. The sides of the envelope 10 prevent vertical movement of the sliders 26 and 28 relative to each other and to the scale 12 yet permit horizontal movement of the sliders.

The secant curve 22 represents the $x$ coordinate and the cosecant curve 24 represents the $y$ coordinate in a system of rectangular coordinates. Although FIGURE 3 shows the slider 26 mounted in the envelope 10 adjacent the window 10c and the slider 28 mounted underneath the slider 26 it is to be understood that these positions may be interchanged.

It is particularly pointed out that the $x$ axis of the rectangular coordinate system coincides with 0° in the polar coordinate system, and the $y$ axis of the rectangular system coincides with 90° in the polar coordinate system. Of course, the same relationships would hold true were the polar system scaled in a quadrant other than 0°–90°, in accordance with the fundamental principles of trigonometry. It is also noted that, although the drawings show only a two-cycle trigonometric scale, the invention is in no way limited to the length of the logarithmic scale. As is apparent, the cosecant function of the angle $a$ increases as the angle decreases, and the secant function of the angle $a$ increases as the angle increases. Thus, the two functions are inversely proportional to each other. The secant curve approaches infinity while the cosecant curve approaches zero. Therefore, the logarithmic scale 12 may contain as many cycles as are necessary for a required degree of accuracy of conversion.

In use, in converting from rectangular to polar coordinates, the slider 26 would be set so that the end point 30 of the secant curve 22, corresponding to the secant of 0°, coincides with the known value of $x$ on the logarithmic scale 12. The slider 28 is positioned so that the end point 32 of the cosecant curve 24, corresponding to the cosecant of 0°, coincides with the known value of $y$ on the logarithmic scale 12. The point of intersection 34 of the curves 22 and 24, read from the logarithmic scale 12, is the value of $r$. The same point of intersection read from the linear scale 14 is the angle that $r$ makes with the $x$ axis.

Conversely, to convert from polar to rectangular coordinates, the sliders 26 and 28 are set so that the point 34 of intersection of the curves 22 and 24 corresponds on the logarithmic scale 12 to the value $r$ and the same point of intersection 34 corresponds to the angle of the polar coordinate read from the linear scale 14. The position of the point 30 on the logarithmic scale 12 will then indicate the $x$ value of the rectangular coordinate and the position of the point 32 will indicate the $y$ value of the other of the rectangular coordinates.

It is particularly pointed out that operation of the device in the aforementioned manner satisfies the equation:
$$r = y \csc a = x \sec a$$
Thus, where the secant and cosecant curves intersect may be utilized to provide the values of either $r$ and $a$ or $x$ and $y$ from the scales 12 and 14.

The fact that this trigonometric relationship is satisfied for all values of $r$ and $a$ by the structural relationships of this device in the specific instance illustrated herein where the problem is to convert from rectangular to polar coordinate and vice versa may be seen more rigorously by considering the following facts. The distance along scale 12 from the zero point to the intersection of curve 22 with the scale is proportional in length to the logarithm of $x$. The remaining distance from this point to the projection on the $x$ axis scale 12 of the intersection point of curves 22 and 24 is proportional to the logarithm of sec $a$. The additive sum of these two logarithms is of course proportional to the logarithm of the multiplicative product "$x$ sec $a$." It is also obvious that based on the trigonometric relationships above discussed in connection with FIG. 1, the logarithm of $r$ is equal to the logarithm of "$x$ sec $a$" for all values of the arguments. Similar reasoning of course applies to the expression "$r = y \csc a$" as this expression is implemented in connection with the $y$ axis. That is to say, if one takes logarithms of both sides of this equation a logarithmic equation is obtained which is implemented by positioning of the related curve. Hence, in the physical operation of superpositioning the two curves 22 and 24 for use with the $x$ axis and $r$ scales and with the $y$ axis and $r$ scales respectively, the device essentially solves the two simultaneous equations expressed by the two values of $r$ when the intersection point of the curves 22 and 24 is projected to the two related pairs of readout scales.

Although only one embodiment of the invention has been shown and described, it is apparent that various modifications may be made by one skilled in the art without departing from the true spirit and scope of the invention.

What is claimed is:

1. A conversion device for converting data between rectangular and polar coordinates comprising:
   an envelope shaped slider-guide structure comprising of parallel spaced apart top and bottom sides, defining a slide channel therebetween;
   first and second scales on the inside surface of the bottom side of said guide structure and arranged normal to each other, said first scale being scaled in units of length and said second scale being scaled in degrees, said top side defining an aperture through which said first and second scales are visible;
   a first slider carrying a first trigonometric function curve and adapted to slide along said first scale in the slide channel of said guide structure; and
   a second slider carrying a second trigonometric function curve and adapted to slide along said first scale in the slide channel of said guide structure;
   said first and second sliders being superimposed on said scales, and slidable with respect to each other and said scales;
   said first and second trigonometric curves varying inversely with each other, with the point of intersection of said curves superimposed on said scales and visible through the aperture in the top side of said structure.

2. The device defined by claim 1, wherein the sliders are transparent except for the curves carried thereon whereby the said first and second scales are visible through said sliders and said first scale is logarithmic and said second scale is linear.

3. The device defined by claim 2, wherein said first and second trigonometric curves are secant and cosecant curves, respectively.

4. A slide-rule type device for converting data from one type of coordinates to another, comprising:
   a guide structure formed of parallel spaced apart top and bottom sides forming a slide channel with opposite open ends;
   first and second scales arranged normal to each other, disposed on the inside surface of said bottom side with the first scale in a direction normal to said ends, said top side defining a window-forming aperture through which said first and second scales are visible;
   a first slider of transparent material defining a first trigonometric function curve, superimposed on said scales and slidably guided in said channel, along said first scale, to selectively position the curve thereon with respect to said scales; and
   a second slider of transparent material defining a second trigonometric function curve, superimposed on said first slider and slidably guided in said channel along said first scale to selectively position the curve thereon with respect to said scales, each slider being slidable with respect to said structure and the other slider, with the point of intersection of said curves superimposed on said scales being visible through said window.

5. The device as recited in claim 4 wherein said first slider has a portion extend out of said channel through one of its open ends and the second slider has a portion extend out of said channel through the opposite open end to facilitate the simultaneous positioning of said sliders within said channel.

6. The device as recited in claim 5 wherein said first scale is in units of length and the second scale in degrees.

7. The device as recited in claim 6 wherein the trigonometric function curves on the sliders are secant and cosecant curves.

8. The device as recited in claim 6 wherein the first scale is logarithmic and the second scale is linear.

9. The device as recited in claim 8 wherein the trigonometric function curves on the sliders are secant and cosecant curves.

References Cited

UNITED STATES PATENTS 2,434,306  1/1948  Wood _____ 235—61

FOREIGN PATENTS 713,655  8/1954  Great Britain.

RICHARD B. WILKINSON, *Primary Examiner.*

L. R. FRANKLIN, *Assistant Examiner.*